(12) United States Patent
Bartels et al.

(10) Patent No.: US 8,985,822 B2
(45) Date of Patent: Mar. 24, 2015

(54) WHEEL MOUNTED LIGHTING ASSEMBLY

(71) Applicants: Kurt W. Bartels, Key Colony Beach, FL (US); Lance Bartels, Key Colony Beach, FL (US)

(72) Inventors: Kurt W. Bartels, Key Colony Beach, FL (US); Lance Bartels, Key Colony Beach, FL (US)

( * ) Notice: Subject to any disclaimer, the term of this patent is extended or adjusted under 35 U.S.C. 154(b) by 105 days.

(21) Appl. No.: 13/835,973

(22) Filed: Mar. 15, 2013

(65) Prior Publication Data

US 2014/0043839 A1    Feb. 13, 2014

Related U.S. Application Data

(60) Provisional application No. 61/681,900, filed on Aug. 10, 2012.

(51) Int. Cl.
*B60Q 1/32* (2006.01)

(52) U.S. Cl.
CPC ........................................ *B60Q 1/326* (2013.01)
USPC .......................................................... 362/500

(58) Field of Classification Search
CPC ........................................................ B60Q 1/326
USPC .......................................................... 362/500
See application file for complete search history.

(56) References Cited

U.S. PATENT DOCUMENTS

| 4,781,419 | A | 11/1988 | Boothe |
| 5,957,542 | A | 9/1999 | Boothe et al. |
| 7,611,267 | B2 * | 11/2009 | Cooper .......................... 362/500 |
| 7,703,958 | B2 * | 4/2010 | Christoff ....................... 362/500 |

* cited by examiner

*Primary Examiner* — Anabel Ton
(74) *Attorney, Agent, or Firm* — The Weintraub Group, P.L.C.

(57) ABSTRACT

A lighting assembly for mounting to the exterior of a wheel of a vehicle includes a mounting assembly which enables the lighting assembly to be mounted to the wheel via the lug nuts ordinarily associated with a wheel cover. The mounting assembly, in one embodiment, includes a twist lock assembly which not only mounts the lighting assembly to the wheel but also stabilizes it while mounted thereto. The lighting assembly includes and interchangeable LED display for providing interchangeable messages, advertising or the like.

13 Claims, 7 Drawing Sheets

WHEEL MOUNTED LIGHTING ASSEMBLY

CROSS REFERENCE TO RELATED APPLICATIONS

This application is a completion application of U.S. Provisional Patent Application Ser. No. 61/681,900, filed Aug. 10, 2012 for "Wheel Mounted Lighted Assembly", the disclosure of which is hereby incorporated by reference in its entirety including the drawings.

BACKGROUND OF THE INVENTION

1. Field of the Invention

The present invention concerns lighting assemblies. More particularly, the present invention concerns vehicular-related lighting assemblies. Even more particularly, the present invention concerns indicia displaying vehicle wheel lighting assemblies.

2. Description of the Prior Art

In U.S. Pat. No. 7,354,182 there is disclosed a lighting assembly which is mounted to the wheel rim bore and which is selectively illuminated, as desired by the user. As noted, the assembly is only positionable or useful if secured to the wheel rim/bore. This is disadvantageous in many respects because of the fixed configuration associated with the lighting emission assembly, itself.

The present invention, as is disclosed hereinafter, overcomes this deficiency by providing a lighting assembly which is capable of being mounted exteriorly of the bore and which is adapted to be deployed with various wheel covers.

The utilization of such a lighting assembly not only provides decorative or aesthetic enhancements to vehicles but also provides a safety device where vehicles can be observed at night and otherwise dark environments.

In addition, the lighting assembly can be deployed on trailers or similar such vehicles.

SUMMARY OF THE INVENTION

The present invention provides an exteriorly mounted lighting display for use in connection with a wheel of a vehicle.

Generally, the present invention comprises a lighting assembly and means for mounting the lighting assembly via the lug nuts of a wheel cover.

In a particular embodiment, the mounting assembly includes twist lock including a mounting plate having a plurality of key ways which twistingly lock in place a lock. A plurality of plungers are used to further stabilize the lighting assembly.

The lighting assembly, per se, includes an interchangeable LED or other lighting such as LCDs, electroluminescent, incandescent and similar light sources for displaying advertising, messages or other indicia.

For a more complete understanding of the invention reference is made to the following detailed description and accompanying drawing.

In the drawing like reference characters refer to like parts throughout the several views in which:

DETAILED DESCRIPTION OF THE PREFERRED EMBODIMENT

At the outset, it is to be noted that the lighting assembly, per se, is substantially the same as that disclosed in the aforementioned U.S. Pat. No. 7,354,182, the entire disclosure of which is hereby incorporated by reference, including the drawings thereof. However, as noted above, the present invention enables the lighting assembly to be mounted exteriorly of a vehicle wheel. It is to be further understood that the present invention exhibits utility with any wheeled vehicle, including in-road and off-road vehicles which mount a wheel to an axle, wheel lug nuts and the like.

Figure 1:
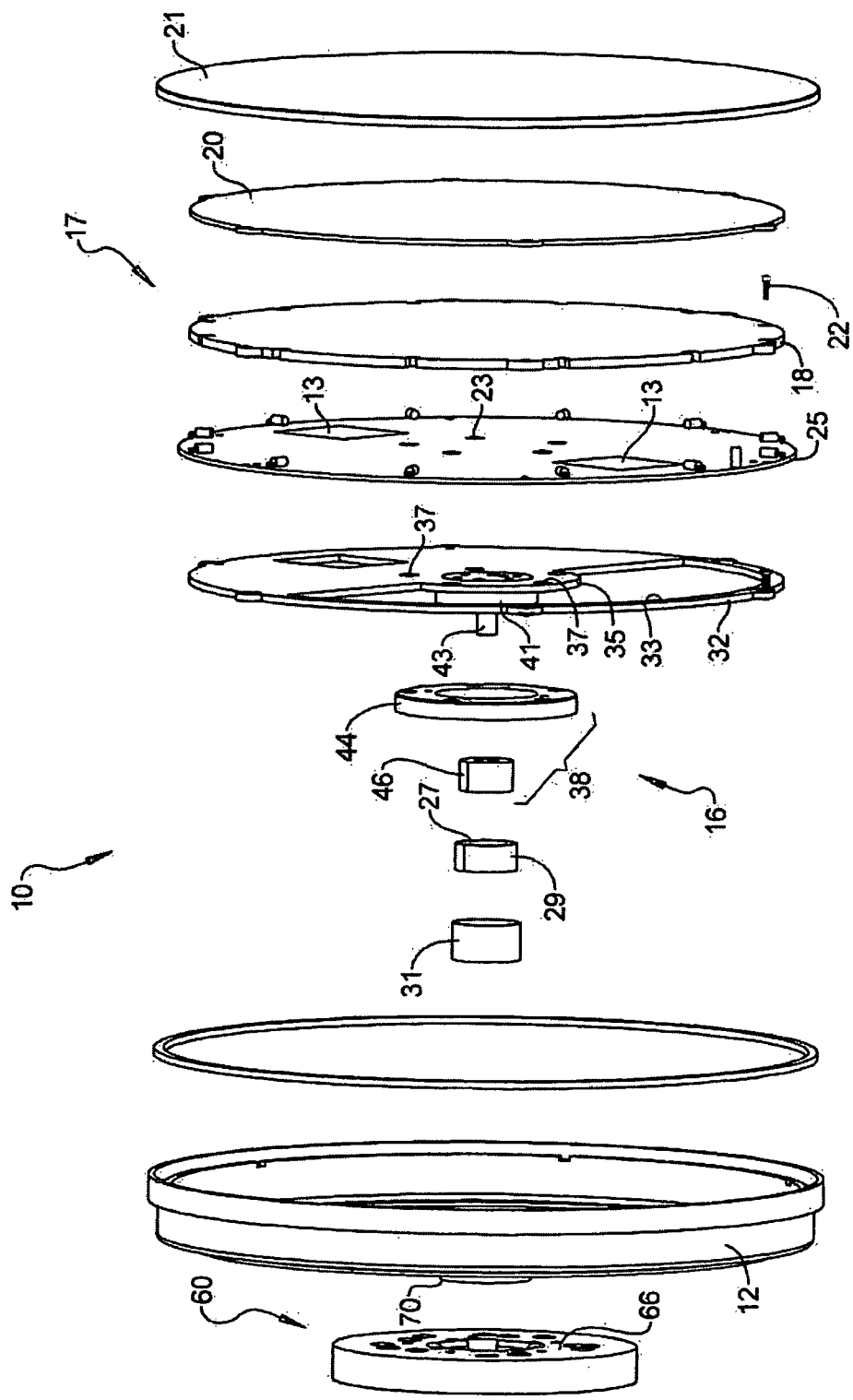
FIG. 1 is an exploded view showing the construction and mounting of the lighting assembly hereof to a quick connect adapter.
Figure 2:
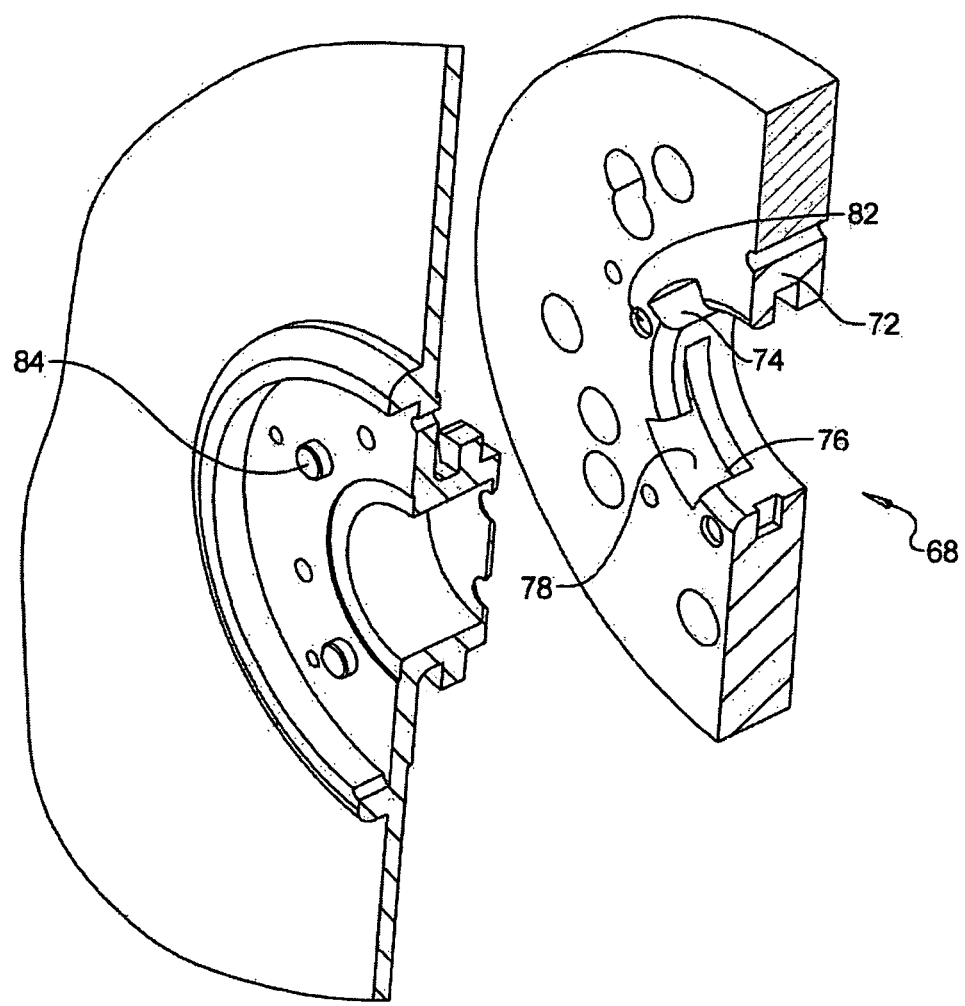
FIG. 2 is a partial view of the quick connect adapter used herein'
Figure 3:
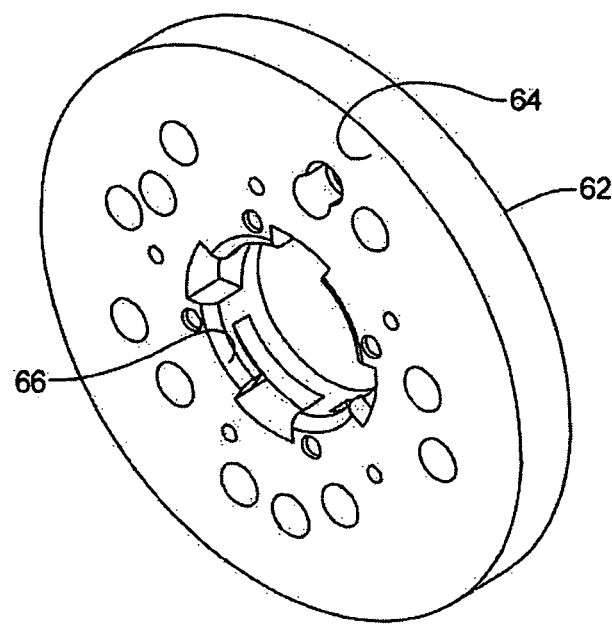
FIG. 3 is a perspective view of the wheel adapter for use herein.
Figure 4:
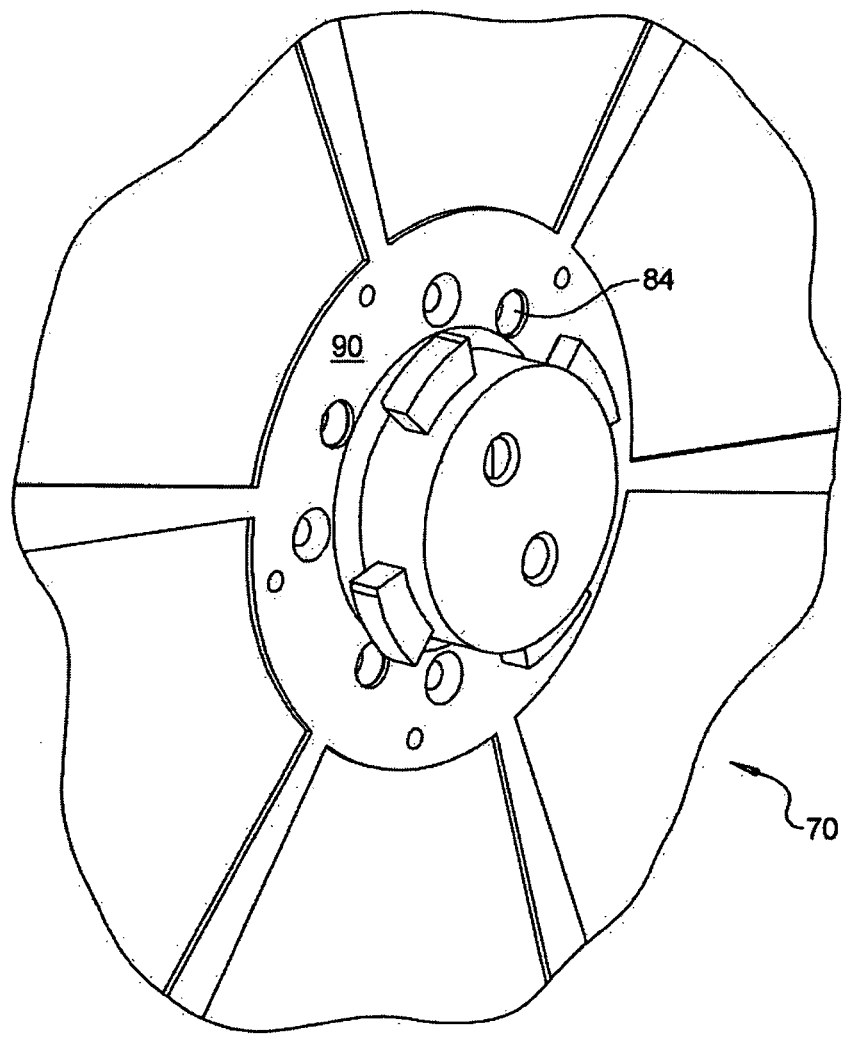
FIG. 4 is a partial perspective view of the quick connect adapter.

Referring now to the drawing, and in particular FIG. 1, there is shown therein a light emission or lighting assembly, generally, denoted at 10. The assembly, generally, comprises a housing 12 in which is disposed a display mechanism. The light emission display mechanism includes a light control portion, generally, denoted at 16 and a diffuser 18.

A first lens 20 is circumferentially disposed within the housing 12 adjacent the diffuser 18 and is retained within the housing 12.

To enhance the aesthetics, a ring or beauty member 122 (FIG. 5) may surround the housing 12. The assembly also includes an exterior lens 21 disposed adjacent the first lens, as shown.

More specifically, the control portion 16 includes a light source 17. The light source 17 comprises a mounting plate 25 having a plurality of LEDs 23 disposed therein and in electrical communication with a pc board 23 which is also fixed on the plate 25. Although the ensuing description is made with reference to LEDs it should be noted that electroluminescent, incandescent and other illumination sources are equally applicable to and within the scope of the present invention.

The lighting assembly 10 is powered by the light control portion 16 which comprises an electromagnetic motor assembly. The assembly includes a stator, magnet and a generataor housing 31. The stator and magnet cooperate to generate electricity as described below. A generator housing 31 has the combined magnet and stator seated or disposed therewithin. The magnet 29, which receives the stator 27 in the conventional manner, may be fixed through a suitable adhesive or frictionally fitted to the housing 31. The stator 27 may be likewise fitted within the magnet 29.

The motor assembly, also, comprises a bearing assembly 38. The bearing assembly 38 includes a bearing mount 44 and a rotatable bearing 46. The bearing assembly 38 receives the generator housing 31, as shown.

A counterbalance 32 maintains the proper orientation of the lighting assembly as the wheel rotates.

The counterbalance 32, also, defines a mounting disk for the plate 25.

The counterbalance 32 has its cutout portion 33 disposed at the top of the counterbalance. The counterbalance further includes a mounting portion 35 having at least one aperture 37 provided therein. The aperture 37 receives a fastener (not shown) for securing the bearing assembly 39 thereto. The mounting portion 35 includes a substantially cylindrical disk 41 about which the bearing assembly 38 is seated. A concentric threaded shaft 43 extends from the disk 41 and projects outwardly therefrom and is secured to the stator 12.

The bearing mount 44 is secured to the housing 12 by a suitable fastener(s), such as threaded bolt(s) or the like (not shown.

The bearing 46 is nested within the mount 44 and is secured to the housing 43 in the well-known manner. The generator housing 31 is affixed to the housing 12 by any suitable means, such as a threaded fastener (not shown). Thus, as the wheel rotates, the bearing permits the counterbalance to remain in position while the motor rotates to cause the pc board to power the LEDs and thus, cause light emission via the LEDs.

A battery backup B is affixed to the plate 25 and is in electrical communication with the pc board 23. Thus, as electricity is generated, excess electricity is stored therewithin. A conventional R-C circuit (not shown) prevents overload of the battery B. All the elements are maintained in position through a seal such as a gasket 50 or the like.

Suitable fasteners (not shown) project through suitable apertures to interconnect the lenses and the counterbalance to the housing 12, as shown.

Figure 5:
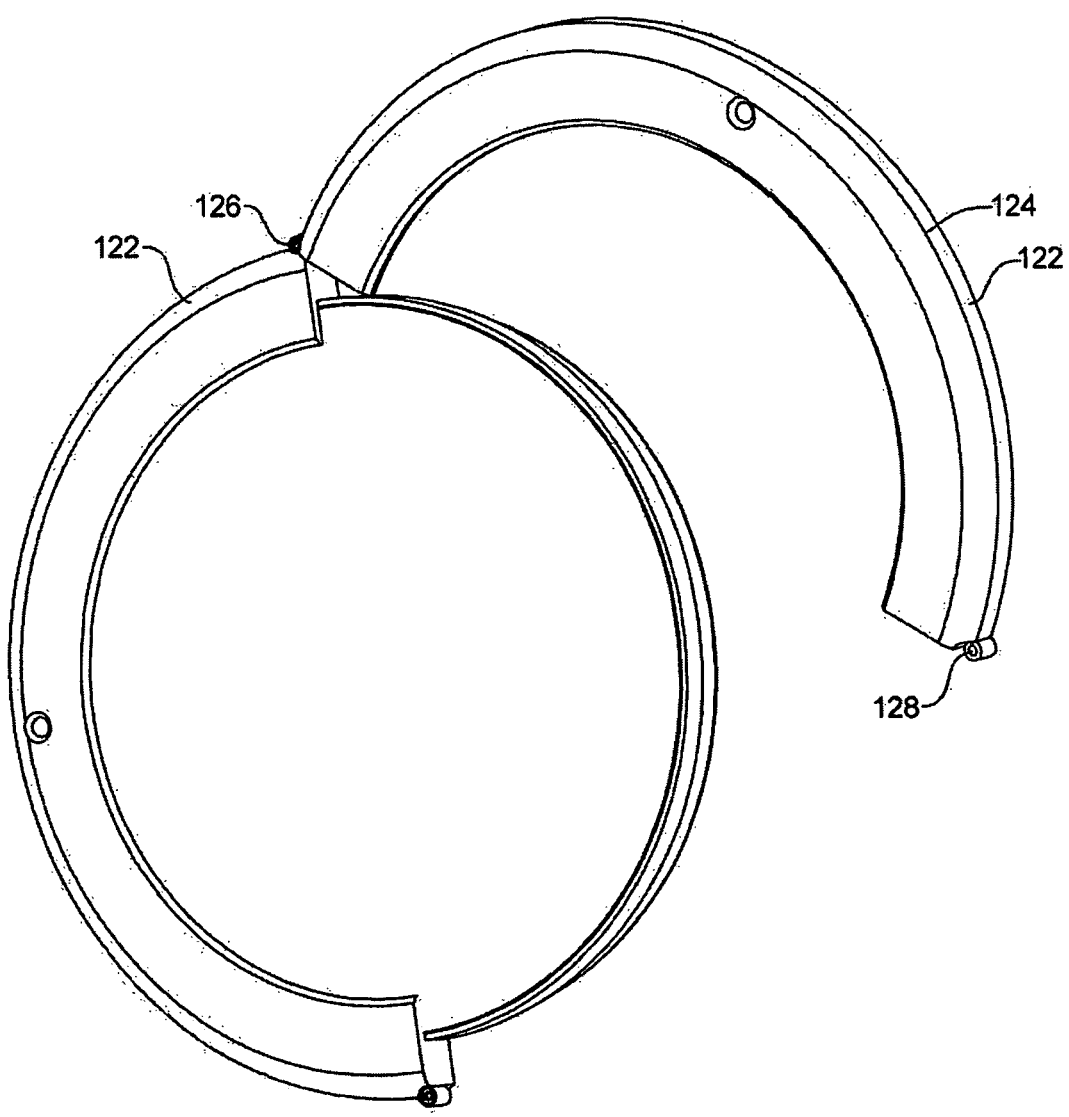
FIG. 5 is a perspective view, partially exposed, of the present invention with the outer ring partially open.

As shown in FIG. 5 the outer ring envelope the assembly. The outer ring comprises a toroidal member having a first section 122' and a second section 124 which are hingedly interconnected by a hinge 126. The hinge rotatably interconnects the two sections at a first position.

A fastener 128 is disposed diametrically opposite the first position.

When the fastener 128 is removed, the first section 122 rotates with respect to the second portion 124 thereby providing access to the internal lenses and assembly. This readily permits changing the front lens 20 to display different indicia.

As is known to the skilled artisan, rotation of a wheel W (FIG. 6) of a vehicle causes generation of electricity to power the LEDs and, thereby, emit light.

As shown in FIGS. 1-4 and 6, in deploying the present invention it is essential to have a lug nut adapter, such as is shown at 60 and which is designed to accommodate the mounting of the present lighting assembly to the exterior of the wheel W. The lug nut adapter 60 contemplated for use herein is a substantially circular 62 plate having a plurality of apertures 64 formed therein. The apertures 64 are designed to be coincident with and mountable onto a lug nut post (not shown) in registry with and secured in place through a lug nut (not shown) in a manner well known to the skilled artisan.

The adapter 60 has a central twist lock socket 68 concentric with the adapter plate 62 and integrally formed therewith. The socket 68 removably receives a twist lock 70 as described hereinbelow.

The twist lock socket 68, comprises a substantially cylindrical element 72 having a plurality of keyways 74 circumferentially disposed therearound. The keyways 74, generally, comprise L-shaped cut-outs 76 which define tracks 78 for a locking element 66 as discussed below.

The socket 68 further comprises a plurality of circumferential openings or perimetral openings 82 which define seats for ball plungers 84 associated with the lock 70.

The lock 70 is removably seated in the socket 68.

As shown, the lock 70 comprises a disk 86 having a plurality of circumferential arcuate projections 88 which are in registry with and nestingly mate with associated cut-outs 76 associated with the socket 68.

The lock 70, preferably, is integrally formed with a plate 90. A plurality of ball plungers 84 are circumferentially disposed about the plate 90. The plungers are spring loaded and normally urge the plungers outwardly toward the socket when deployed.

In use, the projections 88 are nested within their associated cut-outs 76 or tracks. Once inserted into the socket tracks 76 the lock is twisted or rotated to keep the lock in place.

The plungers 84 mate with associated apertures 82 formed in the socket. The plungers further reinforce the stability of the locking feature.

The lock, itself, is preferably integrally formed with the housing 12 and projects laterally outwardly therefrom. The lock is centrally disposed of the housing.

The lug nut adapter is secured to the exterior housing via the lock 70.

Figure 6:
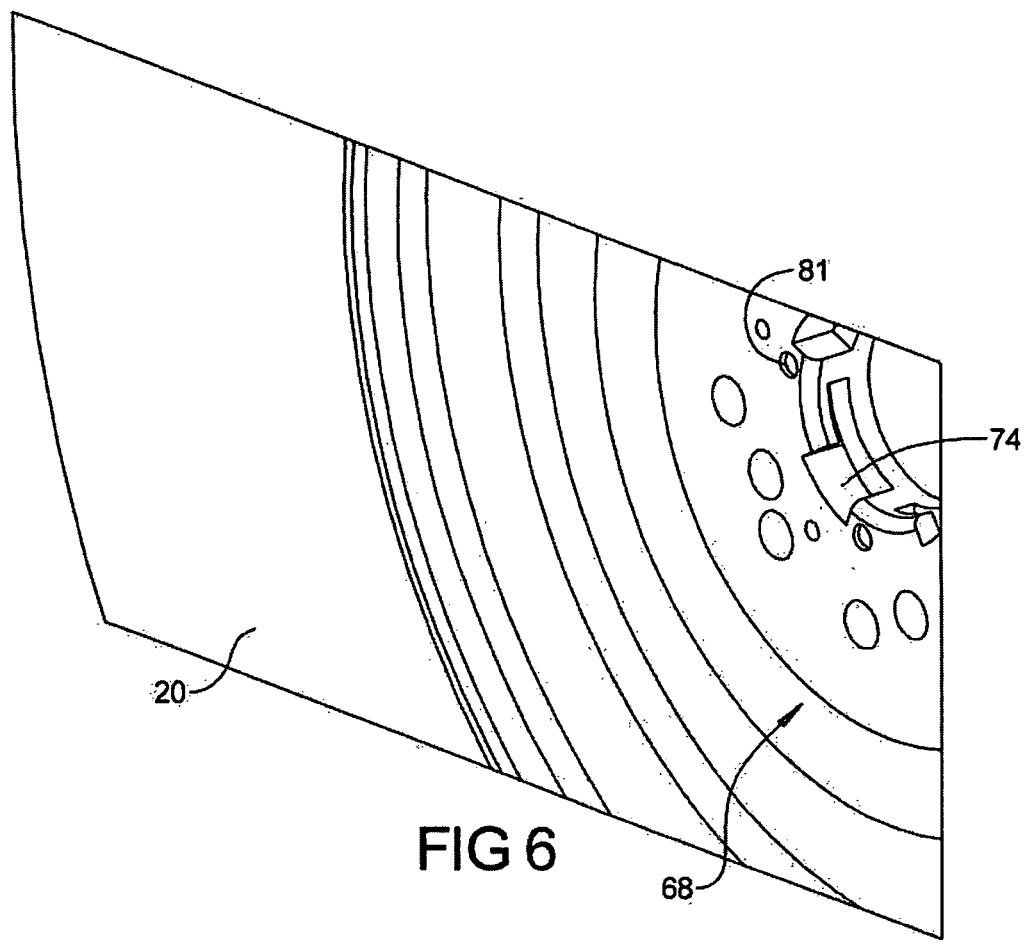
FIG. 6 is a partial perspective view of an adapter plate mounted to a wheel of a vehicle.

Typically, even with luxury vehicles, the center emblem plate is removable to expose the center axle as well as the mounting plate. This enables the universal adapter to be secured thereto through suitable fasteners 81 (FIG. 6).

Figure 8:
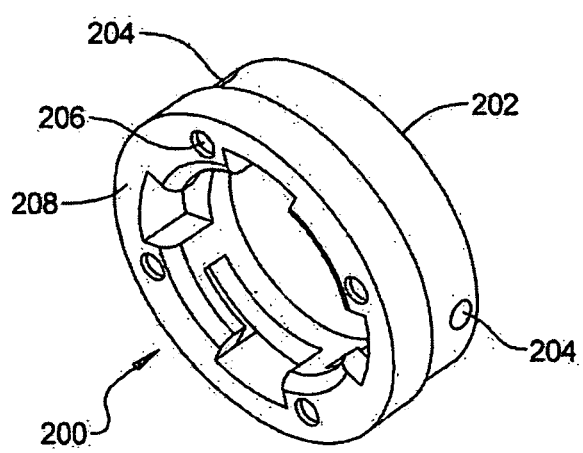
FIG. 8 is a perspective view of a center bore mount adapter in a second embodiment hereof.
Figure 7:
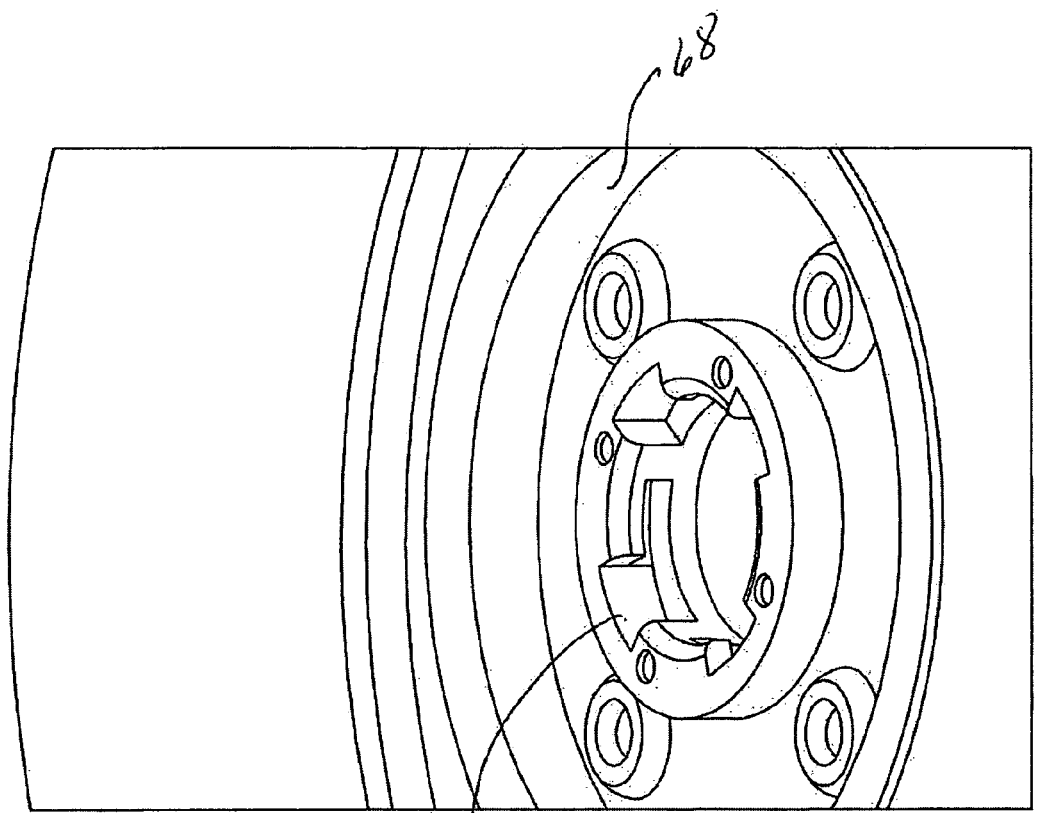
FIG. 7 is a perspective view of a socket mounted to a wheel.

In a second embodiment hereof the present light assembly can be center bore mounted. Referring to FIG. 8 there is shown a center bore mount adapter 200. The center bore mount 200 is inserted over and envelopes the center bore of wheel W inserted to the requisite depth. The mount 200 is a cylindrical member 202 having a plurality of apertures 204 formed therein. A shoulder 206 is integrally formed therewith. Openings or apertures 208 are formed in the shoulder which receive fasteners to fix the adapter place thereto (not shown). Fasteners (not shown) project through the apertures 204 provided therein to secure the center bore adapter. The lock assembly is then secured to the center bore adapter via apertures as shown.

Figure 9:
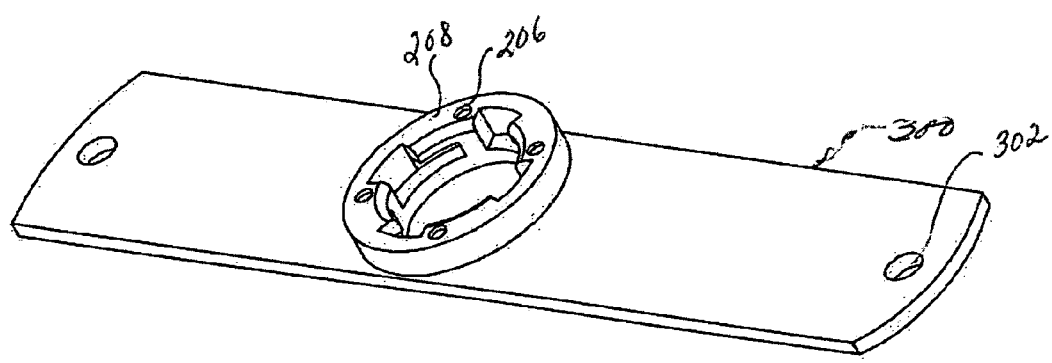
FIG. 9 is a perspective view of an alternate lug nut mounting plate.

In FIG. 9 there is depicted another embodiment of a lug nut adapter 300 which accommodates the assembly of the present invention. As shown, the adapter 300 spans across the axle and is fixed to the wheel via lug nuts. The socket itself is secured to the adapter 300 via suitable fasteners secured via the apertures 302.

It should be further pointed herein that in actuating the present assembly an on-off switch is provided which is used to power up the LEDs, which may be automatic or manual.

The present invention also contemplates the lighting assembly being in communication with a satellite to enable satellite transmission to change the LED display and, thus, any message generated thereby. In this regard, the LEDs can be arranged in any fashion to generate messages through the actuation of selected ones of such LEDs.

Additionally, the assembly hereof can generate a signal, i.e., a GPS tracking signal or a microwave that can be tracked via cell phone towers and the like.

The invention claimed is:

1. In a lighting system for attachment to a vehicle wheel of the type having lug nut posts for cooperating with lug nuts for mounting the wheel to the vehicle axle, the improvement comprising:
   (a) a lighting assembly disposed exteriorly of the vehicle;
   (b) means for removably mounting the lighting assembly to the vehicle wheel, the means for removably mounting comprising a lug nut adapter for securing the lighting assembly via the lug nuts, the lug nut adapter comprising:

(i) a substantially circular plate having a plurality of circumferentially formed apertures adapted to be coincident with the lug nut posts of the wheel,
(ii) a twist lock, and
(c) means for locking the lighting assembly to the lug nut adapter comprising a twist lock socket concentric with the adapter plate.

2. The improvement of claim 1 wherein the twist lock socket comprises a plurality of circumferentially disposed keyways and a plurality of circumferentially disposed perimetral openings.

3. The improvement of claim 2 wherein the means for locking further comprises a lock secured to the lighting assembly, the lock being removably seatable in the socket, the lock having a plurality of projections which nest in the keyways.

4. The improvement of claim 3 wherein the lock further comprises: (a) a circular plate, (b) a plurality of plungers circumferentially disposed about the plate and (c) means for biasing the plungers into associated apertures formed in the socket plate.

5. The improvement of claim 1 wherein the circular plate is a substantially planar member having the plurality of apertures formed therein.

6. The improvement of claim 5 wherein the twist lock socket comprises a plurality of circumferentially disposed keyways and a plurality of circumferentially disposed perimetral openings.

7. The improvement of claim 6 wherein the means for locking further comprises: a lock secured to the lighting assembly, the lock removably seatable in the socket, the lock having a plurality of projections which nest in the keyways.

8. The improvement of claim 7 wherein the lock further comprises: (a) a circular plate, (b) a plurality of plungers circumferentially disposed about the plate and (c) means for biasing the plungers into associated apertures formed in the socket plate.

9. In a lighting system for attachment to a vehicle wheel, the improvement comprising:
(a) a lighting assembly disposed exteriorly of the wheel;
(b) a center bore adapter including a twist lock socket, the socket being secureable to the center bore of the vehicle wheel, the twist lock socket comprising: (a) a cylindrical member having a plurality of apertures formed therein, and a shoulder integrally formed therewith, (b) a plurality of first apertures formed in the shoulder for receiving fasteners to fix an adapter plate thereto, (c) a plurality of second fasteners for securing the center bore adapter to the center bore, and (d) means for locking the lighting assembly to the adapter.

10. The improvement of claim 9 wherein the twist lock socket comprises a plurality of circumferentially disposed keyways and a plurality of circumferentially disposed perimetral openings.

11. The improvement of claim 10 wherein the means for locking further comprises: a lock secured to the lighting assembly, the lock removably seatable in the socket, the lock having a plurality of projections which nest in the keyways.

12. The improvement of claim 11 wherein the lock further comprises (a) a circular plate, (b) a plurality of plungers circumferentially disposed about the plate and (c) means for biasing the plungers into associated apertures formed in the socket plate.

13. The improvement of claim 1 wherein the lighting assembly includes an outer ring encircling the lighting assembly having first and second hingedly interconnected sections, the assembly including at least one interchangeable indicia bearing lens, the ring enabling access to the indicia bearing lens to change the lens.

\* \* \* \* \*